Sept. 25, 1956　　　G. A. F. MACHLET　　　2,764,355
ELECTRONIC MEASURING AND CONTROL APPARATUS
Filed June 10, 1953　　　　　　　　　　　　3 Sheets-Sheet 2
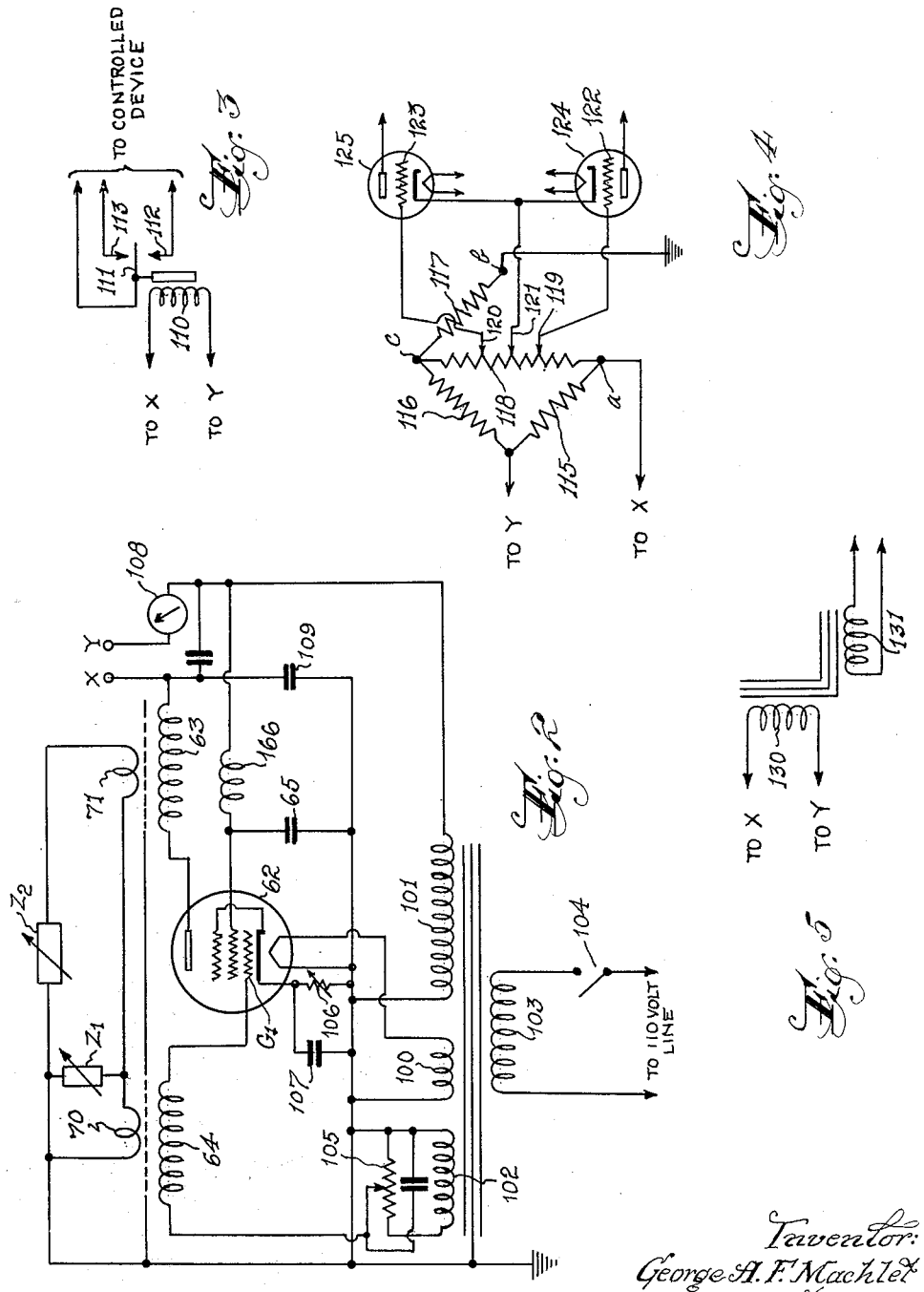
Inventor:
George A. F. Machlet
By: Taylor, Cohen & Jurick
Attorneys.

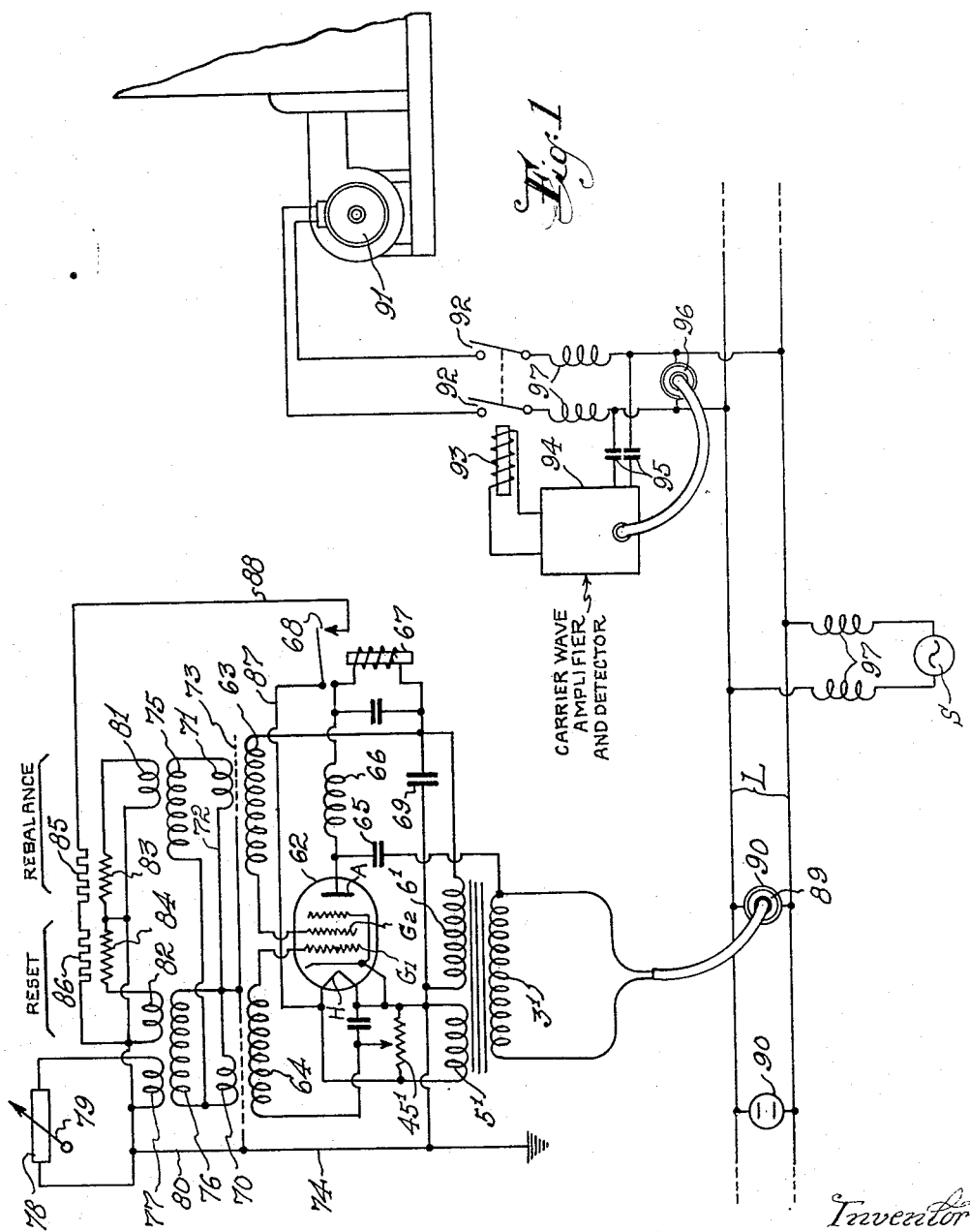

Sept. 25, 1956     G. A. F. MACHLET     2,764,355
ELECTRONIC MEASURING AND CONTROL APPARATUS
Filed June 10, 1953     3 Sheets-Sheet 3

Inventor:
George A. F. Machlet

By Gaylor, Cifelli & Jurick
Attorneys

United States Patent Office 2,764,355
Patented Sept. 25, 1956

2,764,355

ELECTRONIC MEASURING AND CONTROL APPARATUS

George A. F. Machlet, Elizabeth, N. J.

Application June 10, 1953, Serial No. 360,779

19 Claims. (Cl. 236—68)

This invention relates to the communication of intelligence between two or more points, which may or may not be remote relative to each other, by means of a system which permits of a proportional response characteristic that may include other desirable corrective factors and which system does not require the conventional servo or rebalancing network.

More particularly this invention relates to electronic apparatus of high sensitivity and flexibility which responds to variations in a signal factor, or factors, such as temperature, force, direction or amplitude of motion, magnitude, impedance, etc., to register or record the signal factor and/or to energize a governing or control system either in accordance with the change in the signal factor and/or an overruling guiding intelligence.

This application is a continuation-in-part application of my co-pending United States application Serial No. 794,462, filed December 30, 1947, and entitled "Pulsing Electronic Measuring and Control Apparatus," now Patent No. 2,642,228. The subject matter disclosed in my parent application and included in the present application relates to an oscillator circuit incorporating a novel link circuit for affecting the degree of coupling between two coils in the oscillator circuit and wherein a wired radio type of control is effective to control a remotely-positioned device, particularly a furnace. The control function is effected without a direct-connected rebalancing network between the controlled device and the control circuit.

However, my novel circuit arrangement is adapted for use in numerous applications wherein it is desirable, or essential, that the signal detecting and network rebalancing functions be effective at a point remote from the controlled device. Such systems are of importance where it is desirable to register or control the magnitude of a remote signal factor and to energize a governing or control action in accordance with changes in the signal factor and/or an overruling guidance intelligence such as in the case of a guided missile.

An object of this invention is the provision of apparatus responsive to variations in a signal factor and adapted to register or control the magnitude of the signal factor and/or to energize a controlled system in accordance with the changes in the signal factor.

An object of this invention is the provision of apparatus for the transmission of intelligence between two or more points and which apparatus includes a transmitter circuit that effects a desired response in a receiver circuit.

An object of this invention is the provision of a control system that is responsive to a departure of a signal factor from a predetermined normal level and to thereby effect an oscillatory circuit to initiate a corrective action for restoring the signal factor to the predetermined normal level and which control system does not require a direct-connected rebalancing circuit between the signal factor and the control system.

An object of this invention is the provision of an electronic measuring and proportioning control apparatus in which the measuring or control device is energized by current pulses and which apparatus does not require a rebalancing circuit connection from the controlled device to the electronic control circuits.

An object of this invention is the provision of an electronic control system in which a normally balanced input circuit network for an electronic tube is unbalanced by a departure of a control factor from a preselected value, current pulses which vary in duration and/or frequency with the extent of the unbalance are transmitted to a controlled device, and the input circuit network is rebalanced by an impedance which varies in magnitude with the time-integrated average value of the current pulses.

These and other objects and advantages will become apparent from the following description when taken with the accompanying drawings illustrating several embodiments of the invention. It will be understood, however, that the drawings are for purposes of illustration and are not to be construed as defining the scope or limits of the invention, reference being had for the latter purpose to the appended claims.

In the drawings wherein like reference characters denote like parts in the several views:

Figure 1 is a circuit diagram of my novel circuit, including the link circuit, as applied specifically to the control of a furnace located at a remote point;

Figure 2 is a circuit diagram of a system functionally similar to that shown in Figure 1 but modified to accommodate various types of loads or control devices;

Figure 3 illustrates a control relay adapted for connection to the terminals X, Y of the Figure 2 circuit;

Figure 4 illustrates a bridge arrangement for connection to the Figure 2 system whereby regulating power may be developed in response to variations of the impedances in the link circuit;

Figure 5 illustrates a saturable core type of reactor adapted for connection in the Figure 2 system;

Figure 6:
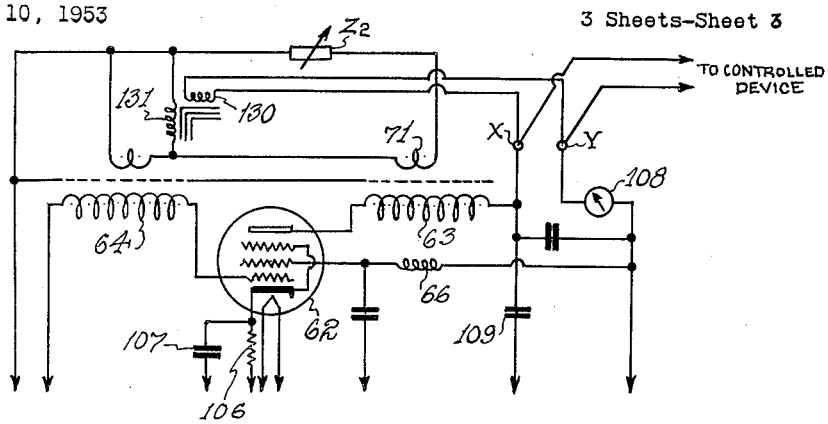
Figure 6 is a fragmentary diagram similar to Figure 2 but modified to stabilize the oscillations at an amplitude corresponding to the changes of the variable impedance in the link circuit.

Reference is now made to Figure 1 which shows a circuit affording a wired radio type of system for controlling an oil burner of the class used for heating purposes and which circuit includes a rebalancing and resetting system of the memory class. Here, I show an electron coupled oscillator including a pentode tube 62 energized from a conventional power line L by a transformer having a primary winding 3', a low voltage secondary winding 5' across which the heater H is connected, and a high voltage secondary winding 6' which is connected between ground and the screen grid $G_2$ through the plate coil 63. As is well known in this art, the screen grid $G_2$ acts as the plate of the oscillator portion of the circuit. The grid coil 64 is connected between the grid $G_1$ and a tap of a potentiometer 45' shunted across the heater winding 5'. Anode A is connected to the primary winding 3' through a condenser 65 and said anode is also connected through a radio frequency choke 66 to the winding of a relay 67 having contacts 68. The plate coil 63 and the circuit including the choke 66 and relay winding 67 are energized by the high voltage transformer winding 6' and the condenser 69 serves as a by-pass for the radio frequency current from the plate coil 63 to the cathode.

The grid and plate coils are coupled by a link circuit including the coils 70, 71, each inductively coupled to the grid coil 64 and plate coil 63, respectively. The lead 72, which connects coils 70, 71, is grounded to an electrostatic shield 73 which extends between the coupling coils and the oscillator coils, and the electrostatic shield is grounded through lead 74. The link circuit includes a coil 75 in series with the coupling coils 70, 71, and a coil 76 shunted across the coupling coil 70. The primary temperature-variant control circuit is, in series, a coil 77 coupled to coil 76 and an impedance 78 which is adjusted as to effective value by a thermo-responsive element 79. The temperature responsive circuit is grounded by a connection 80 to the grounded lead 74.

The rebalancing and resetting circuits of the control system include coils 81, 82 coupled to coils 75 and 76 respectively. These coils are shunted by the temperature-variant resistors 83, 84 respectively. Heaters 85, 86 for resistors 83, 84, respectively, are in series in a circuit across the heater H of the tube; the series circuit comprising lead 87 from the negative side of cathode heater H to the blade element, a lead 88 to the heaters, and the ground connections to the positive potential side of the heater H.

The power transformer which energizes the control system may be permanently wired to the line L but preferably the leads to the transformer terminate in a conventional plug connector 89 which may be inserted in any of the sockets 90 of the house circuits, thereby permitting a transfer of the control apparatus from one room to another. This is of considerable advantage over the present method of controlling the heating furnace according to the temperature at a preselected and fixed point within one room of the house. The temperature within that room can be held at a substantially constant level, but the temperatures in other rooms will vary considerably with changing wind and weather conditions, and also with local heating from fireplaces and electric heaters. The "plug-in" control apparatus permits a location of the control point of the system in any desired room.

The controlled element of the Fig. 1 circuit is a burner 91 which is connected across the line L by contacts 92 of a relay 93 when the latter is energized by a carrier wave amplifier and detector 94. The signal input to the amplifier-detector 94 is from line L through condensers 95, and the power supply to the amplifier-detector is from line L through a conventional plug-in connection 96. Choke coils 97 are preferably included in the line L between the burner and the radio frequency connections to the amplifier-detector unit 94, and also between the line L and the power source S.

The tube 62 is so biased by adjustment of the tap of potentiometer 45' that oscillation accompanied by an increase in plate current occurs at a predetermined degree of coupling of coils 63 and 64 through the link circuit. The coil 76 is in parallel with the link circuit, and an increase in its effective impedance will increase the degree of coupling and the tendency toward oscillation, whereas coil 75 is in series in the link circuit and an increase in its effective impedance will decrease the degree of coupling and the tendency towards oscillation.

The tube 62 is normally biased to develop about one-half the maximum plate current when the room temperature is at the preselected value, and the rebalancing and resetting resistors 83, 84 respectively are at the same temperature and have identical resistance values. The relay 93 is de-energized and the power switch 92 of the burner is open since there is no carrier wave input to the amplifier-detector 94.

As the temperature of the room decreases the input or primary control impedance 78 is progressively adjusted to higher values by the thermo-responsive element 79 and the reflected impedance causes the impedance of the coil 76 to also rise. This has the effect of increasing the degree of coupling between the coils 64 and 63 thereby increasing the intensity of oscillations and the magnitude of the plate current drawn. Such increases in the intensity of oscillations are transmitted to the amplifier-detector unit 94 and relay 93 is energized to close the contacts 92 thereby starting operation of the burner 91. Simultaneously, the plate circuit relay 67 also pulls in to close switch contacts 68 and connect the heaters 85, 86 across the secondary winding 5' of the power transformer. The heat transfer to the rebalancing resistor 83 increases its value which increases the impedance of coil 75 and, therefore, effectively decreases the degree of coupling between the coils 64 and 63 so that a new balance condition is effected. However, it is pointed out that the resetting resistor 84 is simultaneously increased in effective value by the heat transfer from the associated heater 86 but the thermal inertia of the resetting resistor 84 is greater than that of the rebalancing resistor 83. Since the resetting resistor is connected across coil 82 an increase in the value of this resistor increases the effective impedance of the link-shunting coil 76 resulting in a corresponding increase in the degree of coupling between the coils 64 and 63 and, therefore, an increased intensity of oscillations. The effect, upon the circuit oscillations, of changes in the value of the resetting resistor 84 is in the same sense as that brought about by changes in the impedance 78. However, the magnitude effect of the resetting resistor upon circuit operations depends upon the difference between the heat demand and the heat input of the system. Eventually, however, another cycle of operation is initiated when the degree of coupling of the oscillator coils 63, 64 by the link circuit rises to its preselected value and, after a few cycles, a balance is reached between the average heat input and the heat demand to maintain the room temperature at the desired level.

It is apparent that the current flow in the resetting heater 86 and the rebalancing heater 85 is controlled by the contacts 68 of the relay 67. Thus, assuming a condition wherein the circuit is balanced, the relay contacts 68 will be open which results in a cooling of the heaters 85, 86. This results in a decrease in the valve of the rebalancing resistor 83 which increases the intensity of oscillations whereupon the relay contacts 68 close and complete the circuit to the heaters 85, 86. Simultaneously upon closure of the relay contacts 68 the burner control relay contacts 92 close to supply electrical energy to the furnace. During such cyclic, simultaneous, on-off operation of the two relays 67 and 93 it is particularly to be noted that the impedance 78 has not changed in value since the average fuel input to the furnace is just sufficient to offset the thermal losses at the thermo-responsive element 78. It is clear, therefore, that my system operates as a memory system in that the alternate (cyclic) heating and cooling of the heaters 85, 86 is averaged in the thermally-responsive resistor 84, to thereby provide the necessary load-demand compensation.

It is here pointed out that my system differs from those of the conventional memory class in that the total heat placed into the resetting resistor 83 is a direct function of the time and degree of unbalance between the supply and demand. These conditions to be met in my system may be expressed as follows:

$$V_1 + V_2 + V_3 = 0$$

where:
$V_1$ is the control factor signal input which reflects the state of the condition to be regulated, into the control,
$V_2$ is the rebalancing, or modulating signal whose average amplitude must be negatively equivalent to signal $V_1$, and
$V_3$ is the resetting, or restoring (memory) signal whose ultimate amplitude is determined by, and is negatively equal to, $V_2$.

The control and regulating circuits are so designed that upon ultimate operative balance, at the selected factor,
$$V_1 = 0$$
$$V_2 = -V_3$$
$$V_3 = -V_2$$

It is to be noted that the plate circuit relay 67 can be omitted by locating the heaters 85, 86 in any of the circuits associated with the tube 62 and which circuits are responsive to its state of oscillation.

The entire power supply to the controlled device is subjected to an on-off control in the apparatus as illustrated but it is to be understood that there may be a continuous supply of power to the controlled device at a level sufficient to meet the minimum power demand, and that the control will then be imposed only upon a complementary power supply of a magnitude sufficient to increase the total power input to or above the anticipated maximum value.

Those skilled in this art will understand that the pulses coming from the control system may be integrated in the controlled device to provide an end result which will reflect the average power output delivered by the system.

While, in the Figure 1 circuit, I show a relay 67 that is responsive to the oscillations of the oscillator tube and which relay operates simultaneously with the direct wire-connected load control relay 93, it will be apparent that the circuit is not limited to such specific application since the oscillations of the oscillator circuit are in the radio frequency range. For example, the radio frequency currents can be radiated directly, or amplified prior to such radiation, thereby obviating the need for physical transmission means between the control system and the device responsive thereto. In such wireless transmission arrangement, the radiated signals will vary depending upon the departure of the control system from the normal operating zone. When such system is applied to an arrangement wherein the element of secrecy is a factor, such as in the case of a guided missile, the oscillation frequency of the control system preferably should be varied by any adaptable means and the receiver at the control station should include a synchronizing means whereby the normal transmission and reception of the intelligence is not subject to disturbance by external factors. Further, the oscillating circuit of the control system may have superposed thereon independent energy of pre-selected wave form, modulation or other character to represent an overriding guidance intelligence whereby an appropriate receiver may be influenced to react to such guidance intelligence in addition to the normal control function of the system. Those skilled in this art will have no difficulty in making the modifications just mentioned, having in mind the basic circuit illustrated in Figure 1.

While the impedance 78, in the Figure 1 circuit, is of the type which is varied by a thermo-responsive element 78 it will be apparent the circuit operation is not limited to such particular arrangement. The impedance 78 may be varied by any suitable means responsive to factors such as pressure, liquid level, etc. In fact, the impedance 78 may be of the self-varying type such as, for example, a material whose impedance characteristic varies directly with changes in temperature, moisture, pressure, etc.

Figure 2 illustrates another embodiment of my invention and wherein the output of the control system is a function of the amplitude of oscillations determined by the relative magnitude of variable impedances inserted in the link circuit. Here the electrodes of the oscillator tube 62 are energized by the secondary windings 100, 101 and 102 of a power transformer that has its primary winding 103 connected to the power line upon closure of the switch 104. The winding 102 provides the bias for the grid $G_1$, through the potentiometer 105 and the grid coil 64. The variable resistor 106 may be interposed in the cathode return circuit to predetermine the degree of degeneration in order to obtain response characteristics suitable to the particular circuit and the shunting condenser 107 maintains the cathode at ground potential for radio frequency currents. Similarly to the Figure 1 circuit, the grid coil 64 and the plate coil 63 are coupled through the link circuit that includes the coils 70, 71, the degree of coupling being determined by the variable series and shunt impedances $Z_2$ and $Z_1$ respectively. As will be apparent, a decrease in the value of the impedance $Z_1$ will result in a decrease in the coupling factor whereas a decrease in the impedance $Z_2$ will result in an increase in the coupling factor. Such changes in the coupling factor controls the amplitude of the oscillating current flowing in the plate coil 63. Specifically, the tighter the coupling between the grid and plate circuits the greater will be the amplitude of the oscillating current since the oscillator initially is pre-biased to a low value of current.

At the normal balance point, or operating zone, of the system it generally is desirable to adjust the constants of the circuit components so that the oscillating current is of a relatively low amplitude. Such normal, low current operation obviates difficulties which might otherwise arise if one or both of the variable impedances $Z_1$, $Z_2$ are devices of the type whose operation may be adversely affected by high current flow, magnetic flux fields or high potentials or, alternatively, if a high current flow through such devices will effect the operation of associated apparatus or equipment. Further, as a general proposition, it is good practice normally to operate a given circuit at relatively low current magnitudes from the standpoint of practicality. In a conventional oscillator circuit conditions may be encountered where the characteristics of the vacuum tube are affected, in time, so that the normal parameter of the operation of the tube shifts such that when oscillations cease the plate current rises sharply. In my circuit, however, I maintain an initial negative bias on the tube grid, supplied by the winding 102 whereby the discontinuance of oscillations, for any reason, results in an immediate decrease in the plate current flow. Thus the illustrated circuit falls in the general category of "fail safe" type.

In order to maintain a maximum sensitivity of the control system and a maximum flexibility of operations, a portion of the developed oscillatory voltage may either be shifted in phase or rectified and such voltage applied to an element serving as a second control grid of an appropriate tube such as, for example, a 6L7. In such arrangement the current degeneration (such as that introduced by the resistor 106 in Figure 2) may be reduced and, in fact, entirely eliminated. The Figure 1 circuit also may be modified in a similar manner.

As shown in Figure 2, the plate circuit is broken at the terminals identified by the letters X and Y. It will be clear that if these terminals are short-circuited the instrument 108, included in the plate circuit, can be calibrated to provide a direct reading related to the change in either or both of the variable impedances $Z_1$ and $Z_2$. These impedances may be varied in accordance with changes in any variable condition such as, for example, temperature, liquid level, pressure, voltage or etc., and the instrument 108 may be calibrated in appropriate terms to indicate the variations in the particular condition. The radio frequency component of the current flowing in the plate coil 63 may be by-passed to the cathode through the condenser 109, whereby the instrument 108 will respond to the plate current of the tube.

If now, the plate circuit is opened by the provision of the terminals X, Y, numerous types of regulating equipment may be actuated by the control system. For example, the relay shown in Figure 3 may be actuated in response to changes in the oscillator circuit by connecting the operating coil 110 across the system terminals X, Y. Here, the relay may be adjusted so that the movable contact 111 will occupy a mid-position at a given predetermined amplitude of current flowing in the plate coil 63; see also Figure 2. Changes in one or both of the impedances $Z_1$ and $Z_2$ will cause a corresponding change in the amplitude of the oscillator current to thereby cause the movable relay contact 111 to close with one or the other of the stationary contacts 112, 113. Such contact closures can, of course, be utilized for any desired control purpose.

Figure 4 illustrates one possible arrangement whereby regulating power may be developed responsive to variations in the impedances $Z_1$, $Z_2$ of the Figure 2 circuit. Here I show a four arm bridge in which the resistor arm 115 is adapted for connection across the system terminals X, Y. When so connected, and since the bridge terminal "a" is connected to the plate of the tube 62 and the bridge terminal "b" is grounded (as is the tube cathode) it will be apparent that the bridge arm between the bridge terminals "a" and "b" is constituted by the transconductance of the tube 62. The other bridge resistor arms are identified by the numerals 116 and 117. A resistor 118 is connected across the opposed bridge terminals "a" and "c" said resistor having taps 119, 120, 121 associated therewith. The taps 119 and 120 are individually connected to the grids 122, 123 of the tubes 124, 125, respectively, whereas the center tap 121 is connected to each of the tube cathodes, as shown. The bridge is balanced at the balance point, or operating zone, of the control system. It will be apparent that as the transconductance of the tube 62, Figure 2, varies (as a result of changes in the degree of coupling between the grid and plate coils brought about by changes in one or both of the impedances $Z_1$, $Z_2$) the bridge will become unbalanced in one direction or the other and to an extent depending upon the change in the amplitude of the oscillating current flow in the plate coil 63. Since the tap 121, on the bridge resistor 118, is connected to each of the cathodes of the tubes 124, 125, a bridge unbalance results in a change in the bias on the grids 122, 123. It will be noted that the bias applied to the grids 122, 123, is in opposed sense whereby the tubes 124, 125 operate in opposite sense, the actual change in the grid bias being a function of the degree of unbalance of the bridge. Those skilled in this art will understand that the tubes 124, 125, shown in Figure 4, can be used to initiate any desired regulatory, control or measuring action, as for example, a null balance recorder. While I have shown conventional vacuum tubes in the Figure 4 circuit it will be understood that any type of tubes or equivalent devices may be used, say, gas filled tubes, rectifiers, transistors, or etc. Also, a polarized relay can be inserted across the opposed bridge terminals "a" and "c" in place of the resistor 118 to thereby obtain a direct control action without need of the vacuum tubes 124, 125. Still further, control windings for a reversible motor can be connected to the taps 119, 120, 121, in place of the tubes 124, 125, to provide rotation in direction and magnitude in response to variations in the impedances $Z_1$, $Z_2$.

In Figure 5 I show an impedance having a winding 130 adapted for connection across the system terminals X, Y (see Figure 2). This winding may be one winding of a saturable core reactor, or the winding of a magnetic amplifier, or a motor winding or etc. In any case, with the winding 130 connected to the system terminals X, Y, the changes in the amplitude of the oscillatory current flowing in the plate coil 63 are reflected into the associated output winding 131 and the output of the latter may be utilized in conjunction with appropriate networks to vary current, voltage, frequency or phase in accordance with known techniques in this art.

Reference is now made to Figure 6, which is a fragmentary circuit diagram similar to that shown in Figure 2 but modified to stabilize oscillations at an amplitude corresponding to changes of the impedance in the link circuit. Here, the winding 130 of the saturable core reactor is connected to the system terminals X, Y and the associated winding 131 is connected across the coupling coil 70 of the link circuit, in place of the variable impedance $Z_1$ that is shown in Figure 2. A change in the impedance $Z_2$, brought about by a change in the condition being measured, (or controlled) alters the degree of coupling between the link circuit and the grid and plate coils 64, 63, respectively. If the value of the impedance $Z_2$ decreases, thereby increasing the degree of coupling between the said grid and plate coils, the amplitude of oscillations increases and in so doing causes an increased current to flow in the reactor winding 130. Increased current flow in the winding 130 decreases the effective impedance of the winding 131 thereby providing a degenerative action to stabilize the oscillations at an amplitude equivalent to the extent of the change in the variable impedance $Z_2$. Consequently, the changes in the value of $Z_2$ produce corresponding changes in the indications of the instrument 108, whereby the instrument can be calibrated directly in terms of the particular variable condition which affected the change in $Z_2$ in the first instance.

In Figure 6, the circuit as shown is purely a measuring circuit. It is obvious that the circuit can function as a combination measuring and control circuit by connecting any of the control equipment, shown in Figures 3, 4 and 5, across the system terminals X, Y. Obviously the controlled device could be connected in series with the reactor winding 130 instead of in parallel as shown.

Figure 7:
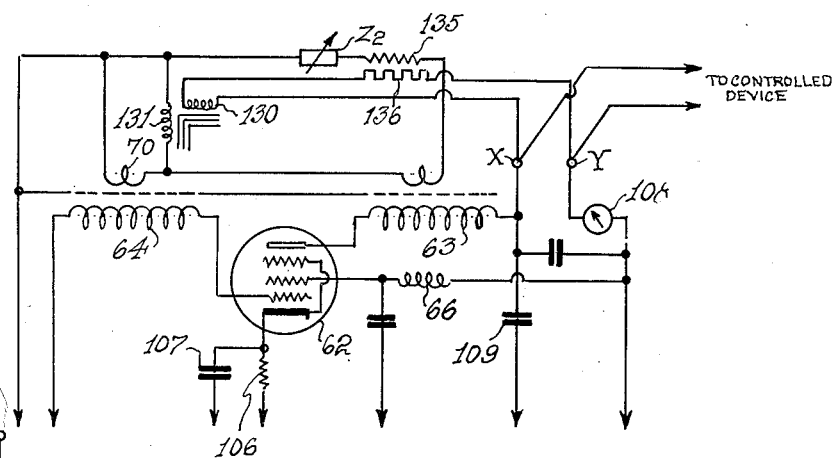
Figure 7 is similar to Figure 6 and includes a memory, or reset, function.

When the Figure 6 circuit is to be used as a control and it is desired to incorporate a "memory" or automatic reset function such as was described with specific reference to Figure 1, such function can be obtained quite simply by inserting a temperature-variant resistor into the link circuit. Such arrangement is illustrated in the fragmentary diagram shown in Figure 7. Here, the temperature variant resistor 135 is inserted in series with the variable impedance $Z_2$ and the associated heater 136 is inserted in series with the winding 130 of the saturable core reactor. Thus, as described hereinabove with reference to Figure 6, when the impedance $Z_2$ decreases in value an increased magnitude of current flows in the circuit of the heater 136 and the winding 130. As the heat is transferred to the resistor 135 it increases in ohmic value and thereby eventually cancels the degree of coupling change initially brought about by the change in the saturable core reactor. The net effect of this action being that a final norm is established at but one value of the variable impedance $Z_2$ and which reflects the actual state of the condition or process under control.

Figure 8:
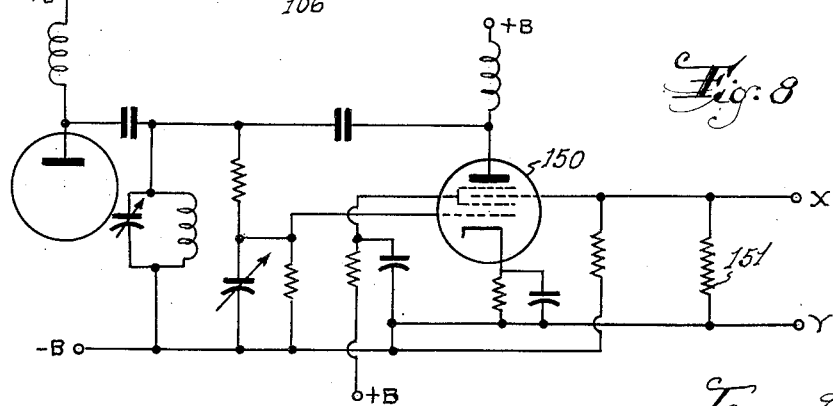
Figure 8 is a circuit diagram of a reactance modulator adapted for connection to the terminals X, Y of the Figure 2 system.

The above-described circuits relate chiefly to systems wherein the measuring and/or control apparatus is responsive to amplitude modulations of the oscillator current brought about by changes in the degree of coupling between the plate and grid coils of the oscillator circuit. However, frequency and/or phase modulations may be utilized to perform the desired end result. One representative form of reactance-modulator circuit suitable for frequency modulation is shown in Figure 8. Here a 6L7 vacuum tube 150 is connected to a radio frequency tank circuit of an oscillator in such a way as to act as a variable inductance. The resistor 151 is connected across the terminals X, Y of the Figure 2 circuit whereby the transconductance of the tube 150 varies in response to changes in the oscillator current flowing in the control system by reason of the change in the voltage drop across the resistor 151, such voltage changes being applied to the control grid of the tube 150.

Having now described several embodiments of my invention those skilled in this art will have no difficulty making specific changes and variations to adapt my novel systems to specific applications. Such changes and variations may be made without departing from the spirit and scope of my invention as set forth in the following claims.

I claim:

1. Electronic apparatus responsive to changes in a condition comprising an oscillator circuit including an input coil and an output coil which coils are not mutually coupled; a closed link circuit coupling the said input and output coils and including a variable impedance that varies to a degree and in a directive sense in accordance with changes in the condition, variations in said impedance changing the degree of coupling between the input and output coils and thereby changing the character of the oscillating current flowing in said coils; and means responsive to the oscillating current.

2. The invention as recited in claim 1, wherein the variable impedance is responsive to changes in a variable condition and the means responsive to the oscillating current is calibrated in terms of the said variable condition.

3. The invention as recited in claim 2 including an electro-magnetic device having a first winding connected in series with the said output coil and a second winding connected in the said link circuit.

4. The invention as recited in claim 1 including a temperature-variant impedance connected in the said link circuit; an electro-magnetic device having a first winding connected in series with the said output coil and a second winding connected in the link circuit; and a heater disposed in heat transfer relationship to the temperature variant impedance and connected in series with the said plate coil.

5. Electronic measuring or control apparatus responsive to changes in a condition comprising an oscillator circuit including an input coil and an output coil which coils are not mutually coupled; a separate closed link circuit including a pair of coils coupling together the said input and output coils; means to change the impedance of the link circuit to a degree and in a directive sense in accordance with changes in the condition and thereby change the character of the oscillating current flowing in the said input and output coils; and means responsive to the said oscillating current.

6. The invention as recited in claim 5, wherein the means to change the impedance of the link circuit comprises a first variable impedance in series with one of the coils of the link circuit and a second variable impedance connected across one of the coils of the link circuit.

7. The invention as recited in claim 6, wherein the means responsive to the oscillating current comprises a four arm bridge balanced at a predetermined level of the oscillating current.

8. Electronic measuring and control apparatus responsive to changes in a variable condition and comprising an oscillatory circuit including an input coil and an output coil which coils are not mutually coupled; a closed link circuit coupling the said input and output coils and controlling the character of the oscillating current flowing in the input and output coils; a first variable impedance in the link circuit and responsive to changes in the variable condition, said first impedance effecting the degree of coupling between the input and output coils in one sense; a second variable impedance in the link circuit; means varying the second variable impedance to effect the degree of coupling between the input and output coils in a sense opposite to that brought about by the first variable impedance; and means responsive to the said oscillating current.

9. The invention as recited in claim 8, wherein the link circuit includes a pair of coils coupling the input and output coils, the first variable impedance is connected in series with said pair of coils, and the second variable impedance is in shunt across one of said pair of coils.

10. The invention as recited in claim 9, wherein the means varying the second variable impedance is controlled by the means responsive to the oscillating current.

11. The invention as recited in claim 8, wherein the means responsive to the oscillating current is calibrated in terms of the variable condition.

12. The invention as recited in claim 8, including a third variable impedance in the link circuit to effect a change in the degree of coupling between the input and output coils in a sense corresponding to that brought about by the said first variable impedance; and means varying the said third variable impedance simultaneously with the second variable impedance but at a slower rate.

13. Electronic measuring or control apparatus responsive to changes in a variable condition and comprising an oscillatory circuit including an input coil and an output coil which coils are not mutually coupled; a closed link circuit coupling the input and output coils and including a control coil; means coupled to the said control coil and adapted to change the impedance of the link circuit in response to the changes in the variable condition; and means responsive to the oscillating current flowing in the said oscillatory circuit.

14. The invention as recited in claim 13 including a second control coil in the link circuit; means coupled to the second control coil to change the impedance in the link circuit in a sense opposite to that brought about by the means coupled to the said first control coil; and means responsive to the said oscillating current to control the said means coupled to the second control coil.

15. Electronic measuring or control apparatus responsive to changes in a variable condition and comprising an oscillatory circuit including an input coil and an output coil which coils are not mutually coupled; a closed link circuit coupling the input and output coils and including a first and a second control coils; a first variable impedance coupled to the first control coil and responsive to changes in the variable condition to alter the impedance of the link circuit in a predetermined sense; a second variable impedance coupled to the second control coil to alter the impedance of the link circuit in a sense opposite to that brought about by changes in the first variable impedance; a third variable impedance coupled to the first control coil to alter the impedance of the link circuit in the same sense as that brought about by the first variable impedance; and means responsive to the oscillating current flowing in the oscillatory circuit to vary the said second and third variable impedance simultaneously but at different rates.

16. The invention as recited in claim 15 wherein the second and third variable impedances are of the temperature-variant type and wherein the means responsive to the oscillating current controls the flow of current in heaters associated in heat transfer relation with the second and third variable resistors.

17. Electronic control apparatus for equipment to which a medium is to be supplied to maintain a control factor at a preselected value said apparatus comprising an electronic tube oscillator including a plate coil and a grid coil; power means energizing the electrodes of the tube; a closed, link circuit coupling the grid and plate coils and including a variable impedance that varies to a degree and in a sense proportional to the departure of the control factor from the preselected value; control means responsive to changes in the current flowing in the said plate coil and controlling the supply of the medium to the equipment; and rebalancing means responsive to changes in the current flowing in the plate coil and cancelling the effect of variations in said variable impedance.

18. Electronic control apparatus for equipment to which a medium is to be supplied to maintain a control factor at a preselected value, said apparatus comprising an electronic tube oscillator including a plate coil and a grid coil disposed in non-mutually coupled relation; power means energizing the electrodes of the tube; a closed link circuit coupling the grid and plate coils; a first variable impedance in the link circuit and responsive to a change in the control factor to alter the impedance of the link circuit in a given sense; a second variable impedance in the link circuit to vary the impedance of the link circuit in a sense opposite to that of the first variable impedance; a third variable impedance in the link circuit to vary the impedance of the link circuit in a sense corresponding to that of the first variable impedance; control means responsive to changes in the oscillating current flowing in the plate coil and controlling the supply of the medium to the equipment; and means responsive to the oscillating current flowing in the plate coil to vary the said second and third variable impedances simultaneously but at different rates.

19. The invention as recited in claim 18, wherein the means to vary the second and third variable impedances is a relay having an energizing coil in the circuit of the plate coil and a pair of contacts, electrical heaters in heat transfer relation with the second and third variable impedances, and circuit elements connecting the heaters to the power means upon closure of the said contacts.

References Cited in the file of this patent

UNITED STATES PATENTS

| | | |
|---|---|---|
| 2,026,874 | Eitel et al. | Jan. 7, 1936 |
| 2,163,403 | Meacham | June 20, 1939 |
| 2,275,452 | Meacham | Mar. 10, 1942 |
| 2,586,686 | Medlock | Feb. 19, 1952 |
| 2,632,086 | Hagen | Mar. 7, 1953 |